US010898022B2

(12) United States Patent
Van Lieshout

(10) Patent No.: US 10,898,022 B2
(45) Date of Patent: Jan. 26, 2021

(54) SUSPENSION AID FOR SUSPENDING AN OBJECT FROM A TUBE

(71) Applicants: Eureka P.D. & E., Geel (BE); IAC BV, HW Barneveld (NL)

(72) Inventor: Steven Van Lieshout, Geel (BE)

(73) Assignees: Eureka P.D. & E., Geel (BE); IAC BV, Geel (BE)

( * ) Notice: Subject to any disclaimer, the term of this patent is extended or adjusted under 35 U.S.C. 154(b) by 296 days.

(21) Appl. No.: 15/903,059

(22) Filed: Feb. 23, 2018

(65) Prior Publication Data
US 2018/0235393 A1   Aug. 23, 2018

(30) Foreign Application Priority Data
Feb. 23, 2017   (NL) ........................................ 2018414

(51) Int. Cl.
| F16L 3/12 | (2006.01) |
| A47H 13/02 | (2006.01) |
| F16B 2/10 | (2006.01) |
| A63J 1/02 | (2006.01) |
| A47H 13/01 | (2006.01) |

(52) U.S. Cl.
CPC ............ *A47H 13/02* (2013.01); *A47H 13/01* (2013.01); *A63J 1/02* (2013.01); *F16B 2/10* (2013.01); *F16L 3/1203* (2013.01)

(58) Field of Classification Search
CPC combination set(s) only.
See application file for complete search history.

(56) References Cited

U.S. PATENT DOCUMENTS

| 545,775 A | * | 9/1895 | Clark | ........................ F16L 3/14 |
| | | | | 248/59 |
| 1,073,679 A | * | 9/1913 | Haussman | ............. F16M 13/02 |
| | | | | 248/316.5 |
| 3,047,263 A | * | 7/1962 | Mittenzwei | ............. F16B 9/026 |
| | | | | 248/72 |

(Continued)

FOREIGN PATENT DOCUMENTS

BE        897094 A    10/1983

OTHER PUBLICATIONS

Search Report for NL 2018414, European Patent Office dated Nov. 7, 2017.

*Primary Examiner* — Monica E Millner
(74) *Attorney, Agent, or Firm* — Patshegen IP LLC; Moshe Pinchas

(57) ABSTRACT

A suspension aid 1 has a frame 3a, 3b and two curved arms 5, 7 rotatably connected thereto. The frame is provided with two pivot axes 9 about which the arms are rotatable. Between the arms there is a transmission element 11 which is slidable in the frame. A suspension element 13 to which an object can be suspended is attached to the transmission element. The arms are rotatably connected to the frame near a first end 5a, 7a and are provided with a toothing 17, 19. The transmission element is provided with two toothed racks 21, 23 which are in engagement with the toothings. The transmission element is provided with a contact surface 29 which, when the suspension aid is around the tube, comes into contact with the tube and stops the transmission element, whereby the frame moves with respect to the transmission element and thereby rotate the two arms with their free ends towards each other.

12 Claims, 5 Drawing Sheets

(56) References Cited

U.S. PATENT DOCUMENTS

| | | | | |
|---|---|---|---|---|
| 3,149,390 | A | * | 9/1964 | McCoy .................... H02G 1/02 24/564 |
| 3,883,929 | A | * | 5/1975 | Fortsch .................... F16L 3/13 24/132 R |
| RE29,037 | E | * | 11/1976 | Caveney .......... H01B 13/01209 269/131 |
| 4,029,277 | A | * | 6/1977 | Bulanda ................ F16G 11/103 248/74.1 |
| 4,213,589 | A | * | 7/1980 | Pierron .................... F16B 2/10 24/327 |
| 4,436,266 | A | * | 3/1984 | Gerding ................ F16L 3/1066 248/58 |
| 4,614,072 | A | * | 9/1986 | Price ........................ E04B 9/10 411/433 |
| 4,877,228 | A | * | 10/1989 | Ripert .................... H01R 43/28 269/156 |
| 6,484,788 | B1 | | 11/2002 | Jerrell et al. |
| 6,953,175 | B1 | * | 10/2005 | Carrera ............ H01B 13/01209 248/58 |
| 2011/0185545 | A1 | * | 8/2011 | Reitzel .................... F16B 45/00 24/510 |

\* cited by examiner

SUSPENSION AID FOR SUSPENDING AN OBJECT FROM A TUBE

TECHNICAL FILED OF THE INVENTION

The invention relates to a suspension aid for suspending an object from a tube, comprising:
- connecting means for connecting the suspension aid to the tube, which connecting means comprise two curved arms which can engage around the tube and which are rotatably connected to one another near a first end and of which the other, second ends are free, as well as
- a suspension element on which the object can be suspended, which suspension element is connected to the connecting means.

BACKGROUND OF THE INVENTION

Such a suspension aid is known from U.S. Pat. No. 6,484,788A. Especially curtains and the like are often hung on rods, especially on platforms and event halls. With this known suspension aid curtains can be hung more easily and more quickly than with the means known until then. In the known suspension aid, the connecting means are formed by two elongate elements which are arranged around the tube and are to be hooked together with the ends. The fitting of the known suspension aid around the tube and the connection of the elongate elements with each other requires some skill and takes the necessary time. Two hands are required for suspending the known suspension means. It is desirable to be able to do this with one hand, also for safety reasons, because in some cases the object needs to be hung up at great height. This both for hanging and uncoupling the object.

SUMMARY OF THE INVENTION

An object of the invention is to provide a suspension aid of the type described in the opening paragraph which can be fitted more easily and quickly around a tube than the known suspension aid. To this end, the suspension aid according to the invention is characterized in that at the location of the first end or near the first end of at least one of the arms, the suspension element is connected to said at least one arm, such that the weight of the object to be suspended there press the arms with the free ends to each other. The suspension aid according to the invention only needs to be pressed with the two arms onto a tube and it is not necessary to connect the free ends together. As a result, the suspension aid according to the invention can be arranged more easily and faster around a tube than the known suspension aid. The suspension aid can be pressed from below around a tube and does not need to be applied to the tube from above. This makes hanging even easier.

Preferably, the suspension element is connected to the arms at or near the first ends of both arms. As a result, a compact construction has been obtained.

In order to arrange the suspension aid more easily around a tube, an embodiment of the suspension aid according to the invention is characterized in that the free ends of the arms are provided with end faces which are formed in a V-shape with respect to the of each other so that when they press against a tube they slide over the circumference of the tube and are thereby moved apart from each other. As a result, the ends of the arms do not have to be pulled apart manually when arranging the suspension aid around a tube, but they automatically move away from each other when the suspension aid is pressed on the tube. These suspension means can be coupled to the tube with one hand.

The arms can directly be connected to each other at a distance from the first ends, and the suspension element can be connected to the first ends, such that the weight of the suspended object pulls the first ends downwards while the free second ends are moved towards each other. Preferably, however, The first ends of the arms can be connected to the transmission element via pivotable arms. However, preferably, the suspension aid further comprises a movable transmission element to which the suspension element is connected, wherein the two arms with their first ends are connected to each other via the transmission element, such that the two arms are rotated by displacement of the transmission element.

A further embodiment of the suspension aid according to the invention is characterized in that the transmission element is provided with two toothed racks and the first ends of the arms are provided with a toothing which extends along a circular arc and said toothing being rotatable about the circle center of the circular arc, which toothings are engaged with the racks. This prevents the arms from being turned so far that the transmission element would get out of the teeth.

Preferably, the distance of the toothing to its circle center is greater than half the distance between center points of the two circles. The frame facilitates the removal of the suspension aid from the tube. By pulling the frame in a direction away from the tube, the arms are moved apart and the suspension aid can easily be removed from the tube in one movement and with one hand.

The free ends of the arms are preferably provided with finger holes. With heavy objects it is difficult to push the frame up with one hand. The finger holes can serve to pull out the two arms when unloading the suspension aid.

The transmission element is preferably provided with two main surfaces which are directed away from one another and which are parallel to each other, wherein to each of the main surfaces one of the racks is attached. As a result, the distance between the toothing and its pivot point can be made larger than half the distance between the two pivot points, as a result of which the clamping force of the free ends of the arms under the influence of the weight of the object is increased such that the weight exerts a torque in the closing direction on the arms, said torque being greater than the torque in opening direction by the normal force of the free ends on the tube caused by the weight. This means that the arms do not have to be completely wrapped around the tube and that different tube diameters can be clamped. The greater the weight, the greater the clamping force around the tube.

Yet another embodiment of the suspension aid according to the invention is characterized in that the transmission element is provided with an end which, when the suspension aid is placed around the tube, moves between the two arms and protrudes from the frame and is provided with a contact surface which, when pushing the suspension aid further on the tube, comes into contact with the tube and stops the transmission element, whereby frame moves with respect to the transmission element and the two arms with their free ends rotate towards each other. The contact surface ensures that the free ends of the arms are moved towards each other when arranging the suspension aid around a tube, and when the suspension aid is around the tube the contact surface prevents the free ends to move away from each other because the transmission element is stopped by the tube.

Preferably, the suspension aid further comprises at least one spring which is present between the two arms or between the frame and the two arms and presses the two arms towards each other. As a result, the suspension aid, if it is not present around a tube, remains in the compact state with the arms moved towards each other and prevents the free ends of the arms of different suspension aids arranged on an object from being hooked into each other when the object is stored.

For cost savings in production, the spring is preferably integrally formed with at least one of the two arms. The suspension element (for example coat hanger) can also be integrally formed with the transmission element for cost savings.

BRIEF DESCRIPTION OF THE DRAWINGS

The invention will be further elucidated below on the basis of drawings. These drawings show embodiments of the suspension aid according to the present invention. In the drawings.

DETAILED DESCRIPTION OF THE DRAWINGS

Figure 1:
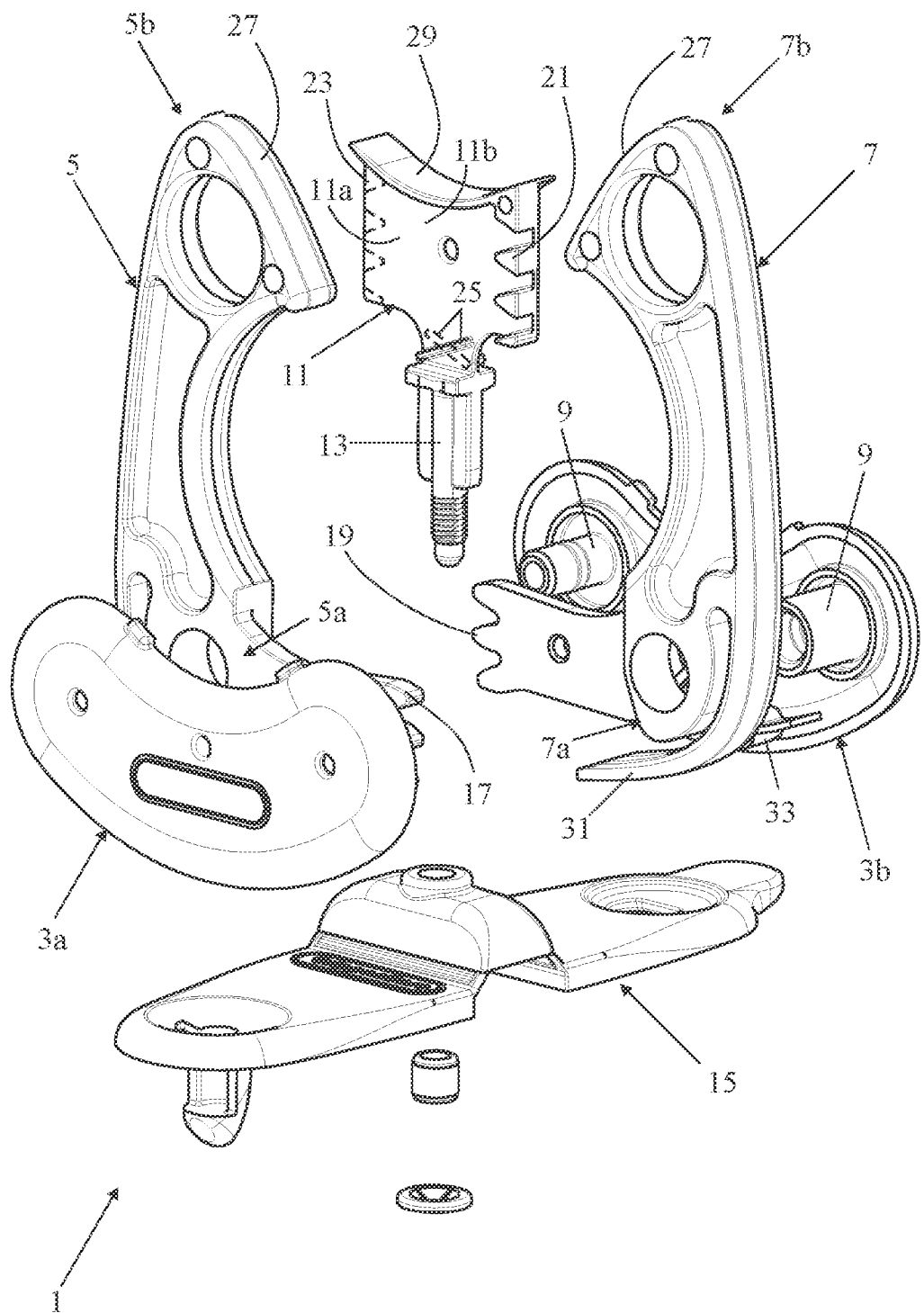
FIG. 1 shows a first embodiment of the suspension aid according to the invention in exploded view.

FIG. 1 shows a first embodiment of the suspension aid according to the invention in exploded view. The suspension aid 1 has a frame consisting of two mutually attached halves 3a and 3b and two curved arms 5 and 7 rotatably connected to the frame. The frame is provided with two pivot axes 9 about which the arms are rotatable. Between the arms there is a transmission element 11 which is slidable in the frame. Attached to the transmission element is a suspension element 13 to which an object, for instance a curtain, can be suspended. A fastening clip 15 can be attached to the suspension element, which can be attached to a curtain.

The arms 5 and 7 are pivotally connected to the frame near a first end 5a and 7a and are provided with a toothing 17, 19 which extends along an arc of a circle and which is pivotable about the circle center of the arc that coincides with the center line of the axes of rotation 9. The transmission element 11 is provided with two main surfaces 11a and 11b which are directed away from each other and are parallel to each other. On each of these main surfaces a gear rack 21, 23 is fixed which is in engagement with one of the toothings 17, 19 on the arms. On each main surface there is furthermore a stop 25 which limits the rotation of the teeth so that the transmission element cannot be pulled out of the frame.

The other, second ends 5b and 7b of the arms are free and provided with end surfaces 27 which are present in a V-shape with respect to each other. As a result, when the suspension aid is placed around the tube, the end faces slide over the circumference of the tube and are thereby moved apart from each other.

One end of the transmission element 11 is provided with a contact surface 29 which, when the suspension aid is placed around the tube, comes into contact with the tube and stops the transmission element, so that the frame moves relative to the transmission element and thereby turns the two arms with the free ends, towards each other. Furthermore, each arm 5, 7 is provided with a spring 31 which is supported against a protrusion 33 present on the frame and presses the arm in the direction towards the other arm.

Figure 2:
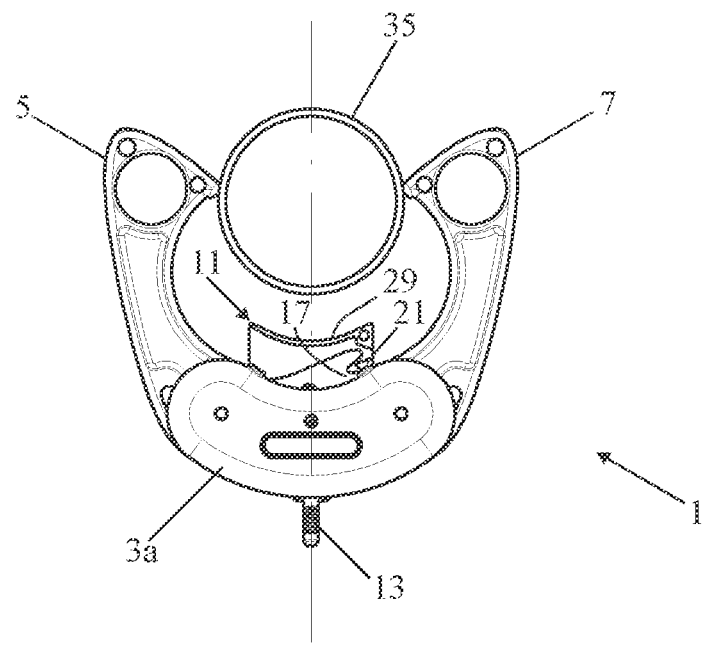
FIG. 2 shows the suspension aid during fitting around a tube in front view.
Figures 3, 4:
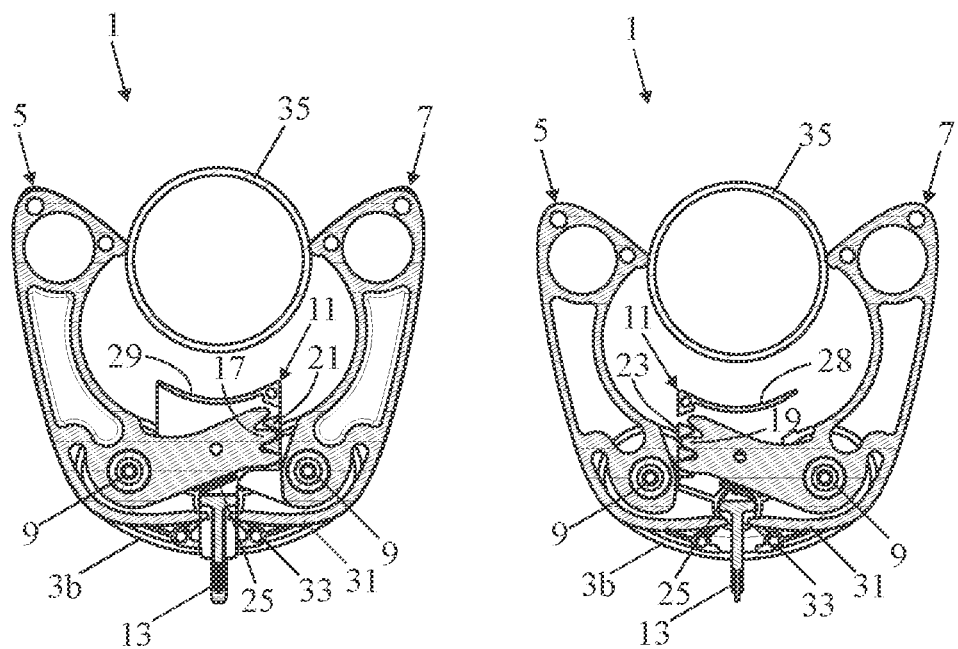
FIG. 3 shows the suspension aid in the position shown in FIG. 2 in cross-section at the location of the front rack.
FIG. 4 shows the suspension aid in the position shown in FIG. 2 in cross-section at the location of the back rack.

In FIG. 2, the suspension aid 1 is shown during fitting around a tube. FIGS. 3 and 4 show different cross-sections of the suspension aid at the location of the racks 21 and 23. The arms 5 and 7 are pushed apart during the pressing of the suspension aid 1 onto the tube 35. This causes the transmission element 11 to move out of the frame 3a, 3b towards the tube. Pushing the suspension aid further on the tube 35, when holding the suspension aid 1 at the frame 3a, 3b, causes the contact surface 29 of the transmission element 11 coming into contact with the tube 35 and causes the frame 3a, 3b moving relative to the transmission element whereby the two arms 5 and 7 are moved towards each other. In the position shown in FIGS. 3-5, the arms 5 and 7 are moved to a maximum distance from each other and they are in contact with the stops 25 near the first end, so that the arms cannot be turned further away from each other.

Figure 5:
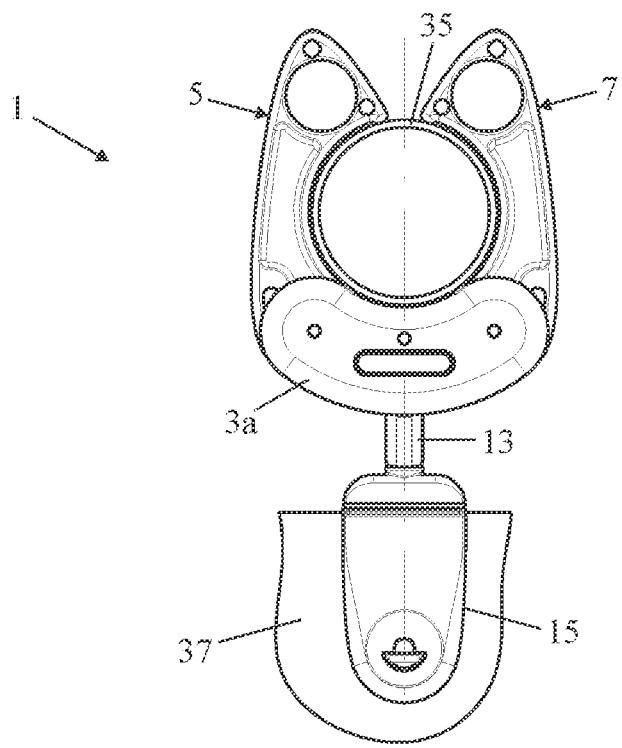
FIG. 5 shows the suspension aid present around a tube in front view.
Figures 6, 7:
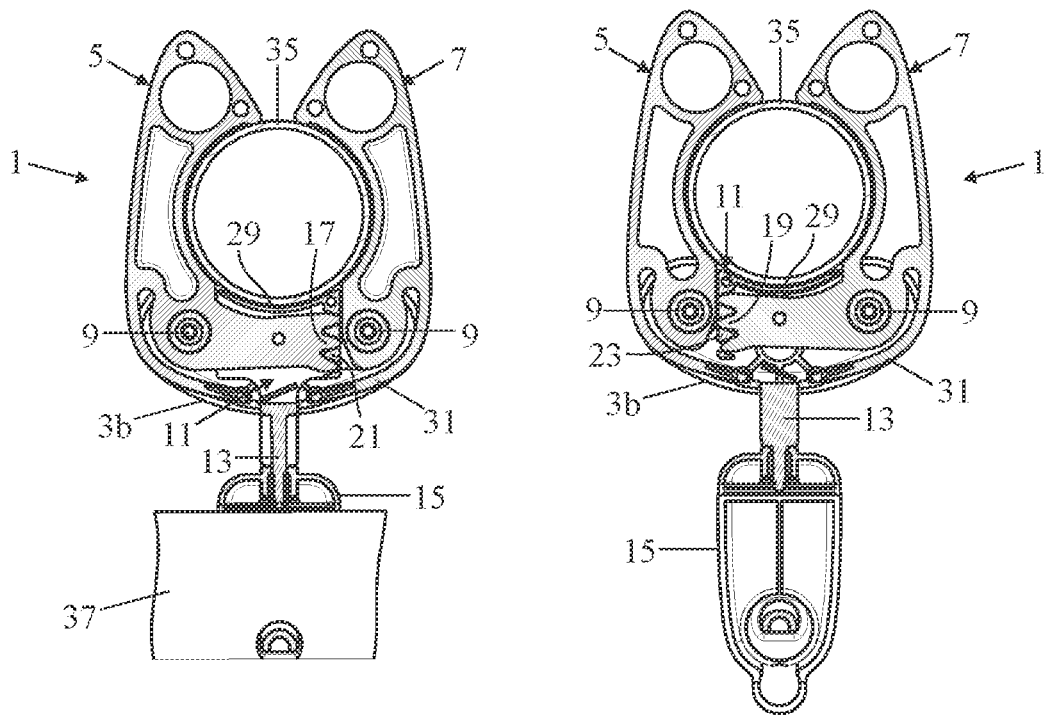
FIG. 6 shows the suspension aid in the position shown in FIG. 5 in cross-section at the location of the front rack.
FIG. 7 shows the suspension aid in the position shown in FIG. 5 in cross-section at the location of the back rack.

In FIG. 5 the suspension aid 1 is shown in a position arranged around the tube 35, the fastening clip 15 being fixed on a curtain 37. FIGS. 6 and 7 show again different cross-sections of the suspension aid at the location of the racks 21 and 23. At the sides of the arms 5 and 7 facing each other, the arms are circular arc-shaped and are tightly around the tube 35.

Figure 8:
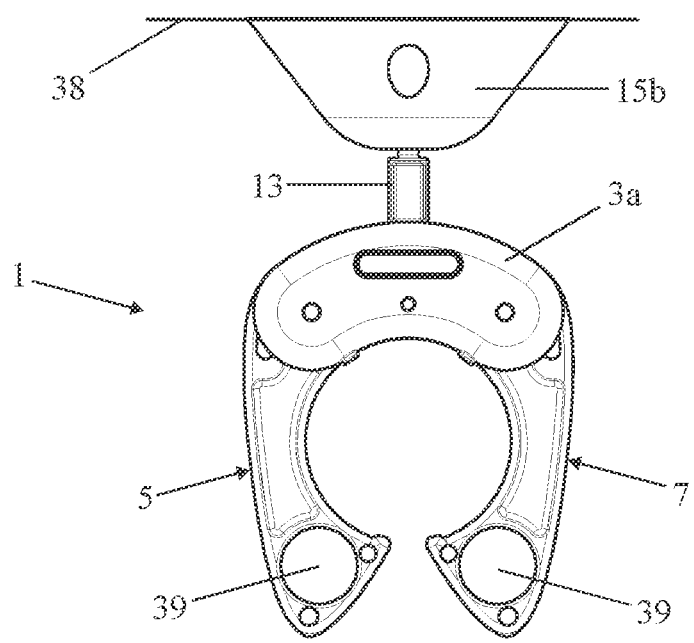
FIG. 8 shows another way of using the suspension aid with the suspension element upwards against a ceiling.

The suspension aid according to the invention can also be used in a way different from that described above. In FIG. 8, the suspension aid 1 is directed with the suspension element 13 upwards and fixed to a ceiling 38 with a fastening body 15b. A tube or other object can hereby be fixed between the arms 5 and 7. The release of the tube (or other object) from the suspension aid 1 can in this case be effected with the aid of the finger holes 39.

Figure 9:
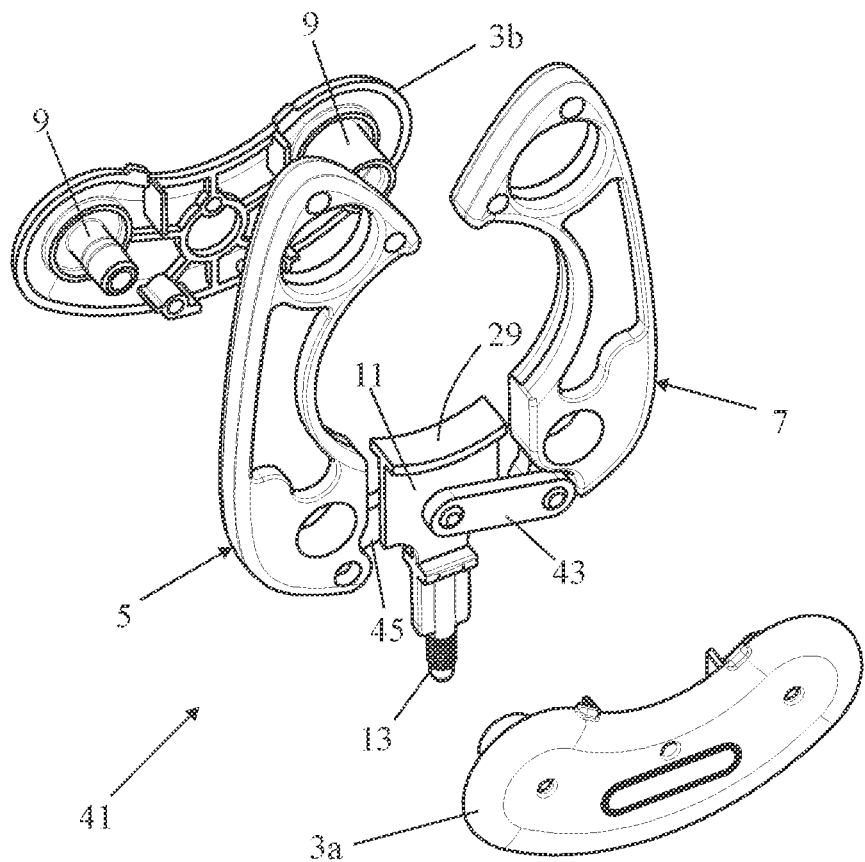
FIG. 9 shows a second embodiment of the suspension aid according to the invention in exploded view.

FIG. 9 shows a second embodiment of the suspension aid according to the invention in exploded view. All parts which are identical to those of the first embodiment described above are indicated by the same reference numerals. In this suspension aid 41 the two arms 5 and 7 are nearby the first ends connected to the transmission element 11 by means of coupling arms 43 and 45, instead of by means of toothings. The coupling arms are with both ends pivotable connected to the arms 5 and 7 and to the transmission element 11. When the suspension aid is around the tube, the angle of the coupling arms with the horizontal plane (i.e. the plane through the two pivot axes of the arms) is chosen (small)

such that the pressure force in the coupling arms caused by the weight of the object is increased in such a way that in combination with the chosen distance between the pivot points of the coupling arms on the arms and the pivot points of the arms, cause a torque in the closing direction on the arms which is greater than or equal to the torque in the opening direction caused by the normal force of the tube at the ends of the arms.

Figures 10, 11:
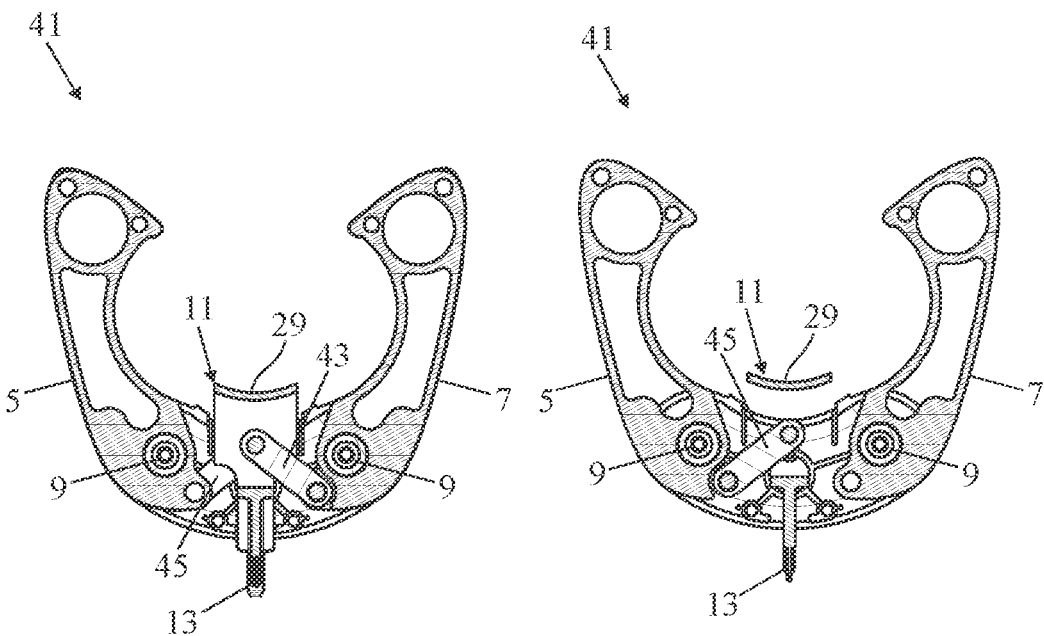
FIG. 10 shows the suspension aid shown in FIG. 9 in the position shown in FIG. 2 in cross-section at the location of the front rack.
FIG. 11 shows the suspension aid shown in FIG. 9 in the position shown in FIG. 2 in cross-section at the location of the back rack.
Figures 12, 13:
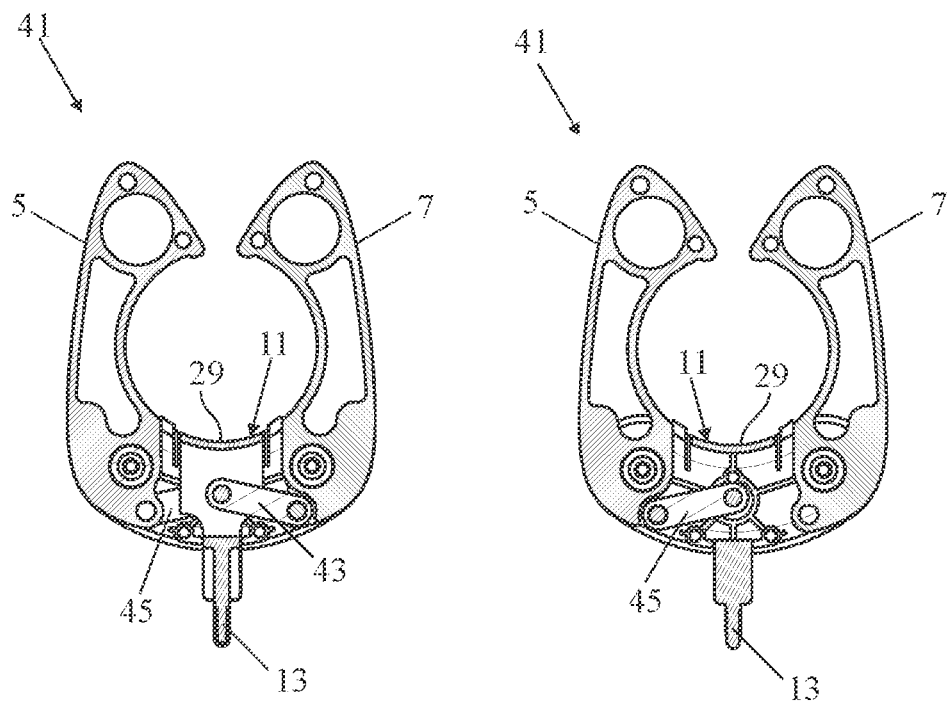
FIG. 12 shows the suspension aid shown in FIG. 9 in the position shown in FIG. 5 in cross-section at the location of the front rack.
FIG. 13 shows the suspension aid shown in FIG. 9 in the position shown in FIG. 5 at the location of the back rack.

For clarity, in FIGS. 10 and 11 the suspension aid 41 is shown in various cross-sections during fitting around the tube 35 and in FIGS. 12 and 13 the suspension aid 41 is shown in various cross-sections in position present on the tube 35.

Both in the first and in the second embodiment, the arms of the suspension aid are identical to each other. The two halves of the frame are also identical to each other. As a result, the suspension aid according to the first embodiment consists of only three different parts (arms, transmission element and frame halves) and the suspension means according to the second embodiment consists of only four different parts (in addition to the three mentioned parts also the coupling arms).

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

The invention claimed is:

1. A suspension aid for suspending an object from a tube, comprising:
   connecting means for connecting the suspension aid to the tube, which connecting means comprise two curved arms which can engage around the tube and which are rotatably connected to one another near a first end and of which the other, second ends are free, as well as
   a suspension element configured for suspending an object thereon, which suspension element includes a movable transmission element which is movable relative to the two arms along a straight line towards and away from the tube, such that weight of the object suspended on said suspension element causes said suspension element to displace away from the tube along said straight line;
   wherein said transmission element is connected to said curved arms at the location of the first end or near the first end, such that the two arms are rotated by displacement of the transmission element along said straight line and such that displacement of said transmission element along said straight line in a direction away from the tube urges the second ends of said two arms towards each other.

2. The suspension aid according to claim 1, wherein the suspension element is connected to the arms at or near the first ends of both arms.

3. The suspension aid according to claim 1, wherein the free ends of the arms are provided with end faces which are formed in a V-shape with respect to the of each other so that when they press against a tube they slide over the circumference of the tube and are thereby moved apart from each other.

4. The suspension aid according to claim 1, wherein the transmission element is provided with two toothed racks and the first ends of the arms are provided with a toothing which extends along a circular arc and said toothing being rotatable about the circle center of the circular arc, which toothings are engaged with the racks.

5. The suspension means according to claim 4, wherein the distance of the toothing to its circle center is greater than half the distance between center points of the two circles.

6. The suspension aid according to claim 4, wherein the transmission element is provided with a stop near each toothed rack, said stop limits the rotation of the toothing.

7. The suspension aid according to claim 1, wherein the suspension aid is provided with a frame to which the two arms are rotatably connected close to their first ends and in which the transmission element is movable, wherein the transmission element is present between the first ends of the two arms.

8. The suspension aid according to claim 4, wherein the transmission element is provided with two main surfaces which are directed away from one another and which are parallel to each other, wherein to each of the main surfaces one of the racks is attached.

9. The suspension aid as claimed in claim 7, wherein the transmission element is provided with an end which, when the suspension aid is placed around the tube, moves between the two arms and protrudes from the frame and is provided with a contact surface which, when pushing the suspension aid further on the tube, comes into contact with the tube and stops the transmission element, whereby the frame moves with respect to the transmission element and the two arms with their free ends rotate towards each other.

10. The suspension aid according to claim 1, wherein the free ends of the arms are provided with finger holes.

11. The suspension aid according to claim 7, wherein the suspension aid further comprises at least one spring which is present between the two arms or between the frame and the two arms and presses the two arms towards each other.

12. The suspension aid according to claim 11, wherein the spring is integrally formed with at least one of the two arms.

* * * * *